(12) United States Patent
Kasai et al.

(10) Patent No.: US 8,994,512 B2
(45) Date of Patent: Mar. 31, 2015

(54) RFID SYSTEM

(75) Inventors: Hirokazu Kasai, Kyoto (JP); Hidekatsu Nogami, Kusatsu (JP); Kazushi Yamasaki, Kusatsu (JP); Shuichi Matsui, Kusatsu (JP)

(73) Assignee: Omron Corporation, Kyoto (JP)

( * ) Notice: Subject to any disclaimer, the term of this patent is extended or adjusted under 35 U.S.C. 154(b) by 451 days.

(21) Appl. No.: 13/358,851

(22) Filed: Jan. 26, 2012

(65) Prior Publication Data

US 2012/0146774 A1 Jun. 14, 2012

Related U.S. Application Data

(63) Continuation of application No. PCT/JP2011/056434, filed on Mar. 17, 2011.

(30) Foreign Application Priority Data

Nov. 1, 2010 (JP) ................. 2010-245151

(51) Int. Cl.
*H04Q 5/22* (2006.01)
*G08B 13/14* (2006.01)
*G06K 7/00* (2006.01)
(Continued)

(52) U.S. Cl.
CPC .......... *G06K 7/0008* (2013.01); *G06K 7/10445* (2013.01); *G06K 2017/0045* (2013.01); *G06K 7/10079* (2013.01); *G06K 7/10356* (2013.01); *H04Q 9/00* (2013.01); *H04Q 2209/47* (2013.01)
USPC ... 340/10.42; 340/10.1; 340/10.4; 340/572.1; 340/572.9

(58) Field of Classification Search
USPC ............... 340/10.1–10.6, 10.42, 572.1–572.9
See application file for complete search history.

(56) References Cited

U.S. PATENT DOCUMENTS

| | | |
|---|---|---|
| 8,242,958 B2 | 8/2012 | Liao et al. |
| 8,334,754 B2 | 12/2012 | Kasai et al. |

(Continued)

FOREIGN PATENT DOCUMENTS

| | | |
|---|---|---|
| CN | 101680963 A | 3/2010 |
| CN | 101770009 A | 7/2010 |

(Continued)

OTHER PUBLICATIONS

International Search Report for corresponding International Application No. PCT/JP2011/056434, dated Apr. 26, 2011.

(Continued)

*Primary Examiner* — Daniel Wu
*Assistant Examiner* — Mancil Littlejohn, Jr.
(74) *Attorney, Agent, or Firm* — Greenblum & Bernstein, P.L.C.

(57) ABSTRACT

An antenna is disposed near a route of mobile object. A fixed tag is disposed at a location where a radio wave can be received from the antenna. When receiving a read command from the antenna, a mobile tag attached to the mobile object and the fixed tag send back a response signal at prescribed timing. A signal received from the fixed tag by the antenna is substantially constant. The signal from the fixed tag cannot be read while buried in a signal transmitted from the mobile tag to the antenna while the mobile tag is positioned at a location where communication with the antenna is expected. Conversely, when the mobile tag is at least a prescribed distance away from the antenna, the signal from the mobile tag cannot be read while buried in the signal from the fixed tag.

3 Claims, 11 Drawing Sheets

(51) Int. Cl.
*G06K 7/10* (2006.01)
*H04Q 9/00* (2006.01)
*G06K 17/00* (2006.01)

(56) References Cited

U.S. PATENT DOCUMENTS

2008/0231420 A1* 9/2008 Koyama et al. .............. 340/10.1
2010/0214073 A1 8/2010 Kasai et al.
2011/0260923 A1 10/2011 Liao et al.

FOREIGN PATENT DOCUMENTS

| JP | 2006-072672 | 3/2006 |
|---|---|---|
| JP | 2006072672 A * | 3/2006 |
| JP | 2006-100893 | 4/2006 |
| JP | 2009-276939 | 11/2009 |
| JP | 2010-39858 | 2/2010 |

OTHER PUBLICATIONS

Written Opinion of the International Searching Authority for corresponding International Application No. PCT/JP2011/056434, dated Apr. 26, 2011.

Office Action in Chinese CN201180002972.9, with English language translation, dated Jul. 2, 2014.

* cited by examiner (1)

(2)

(1)

(2)

RFID SYSTEM

CROSS-REFERENCE TO RELATED APPLICATION

This is a continuation application of PCT/JP2011/056434 filed Mar. 17, 2011, designating the United States of America, the disclosure of which, including the specification, drawings, and claims, is incorporated by reference in its entirety. The disclosure of Japanese Patent Application No. 2010-245151 filed Nov. 1, 2010, including the specification, drawings, and claims are expressly incorporated herein by reference in its entirety.

FIELD OF THE DISCLOSURE

The present disclosure relates to an RFID (Radio Frequency Identification) system that recognizes a moving object (hereinafter referred to as a "mobile object") during movement of the mobile object.

BACKGROUND INFORMATION

In the RFID system, radio communication is performed between an RFID tag (hereinafter sometimes simply referred to as a "tag") and a reader/writer. Particularly, in an RFID system in which a passive or semi-passive RFID tag is used, conveniently the RFID tag can be started up by a radio wave from the reader/writer to perform communication. Therefore, the RFID system is used in various applications.

For example, in a production plant, an article is conveyed by a conveyer while the RFID tag is attached to each article of a management target, an antenna of the reader/writer is installed in a vicinity of the conveyer, and the communication is performed between the RFID tag and the antenna every time the RFID tag enters a communication range of the antenna with movement of the article, thereby executing a process of reading/writing information (see Patent Document 1).

There is also well known a system in which, in order to manage entrance and exist, the antenna of the reader/writer is installed in a passageway to an entrance door, and the RFID tag attached to the mobile object (person or article) that passes through the passageway reacts to a command from the antenna.

For example, Patent Document 2 describes that, in a system that acquires identification information from the RFID tag passing through a plurality of gates located close to each other, a read signal is transmitted from the antenna installed in each gate, pieces of identification information are acquired by response signals from all the RFID tags that receive the read signal, and a filtering process of removing the identification information from the unnecessary RFID tag is executed.

Patent Document 3 describes that an interrogator (reader/writer) and a fixed tag are installed in each of the plurality of gates through which a person passes, and in each interrogator, a mobile tag that is possessed by the person passing through the gate and the fixed tag are simultaneously read a plurality of times per unit time, and whether the mobile tag exists in each gate is determined by availability of communication with each tag or a communication success rate. Patent Document 3 also describes that, when determined that the mobile tag does not exist due to difficulty of communication with the fixed tag, it is recognized that the radio wave to the fixed tag is interrupted by a person who does not possess the mobile tag, and the tag responding to the command from the interrogator is shifted in each type of the tags by allocating individual time slots to the fixed tag and the mobile tag.

PATENT DOCUMENTS

Patent Document 1: Japanese Unexamined Patent Publication No. 2010-39858
Patent Document 2: Japanese Unexamined Patent Publication No. 2009-276939
Patent Document 3: Japanese Unexamined Patent Publication No. 2006-72672

Problems Solved by the Disclosure

In development of the RFID system aimed at managing entrance and exit of a vehicle such as a forklift, the inventors of the present disclosure constructed a system illustrated in FIG. 13 and checked usability of the system. In the system, antennas A1 to An of the reader/writer are disposed on one side of each of a plurality of routes R1 to Rn that are closely provided in parallel, and an RFID tag t is attached to a forklift B. For example, information on goods brought in by the forklift B is previously written in the RFID tag t.

The antennas A1 to An sequentially transmit the read command, and wait for receiving the response signal from the tag t until a prescribed waiting time elapses. In the case that the antennas A1 to An receive the response signal during the waiting time, information included in the response signal is read and analyzed to check whether goods are brought in.

However, in the above method, as illustrated in FIG. 14, the RFID tag t on a route R2 reacts to the radio wave from the antenna A3 on a route (in this case, a route R3) different from the route (in this case, the route R2) that the forklift B actually enters, and therefore false information is read to generate an error in a recognition result.

In the method described in Patent Document 2, in consideration of the reception of the signal from the tag existing around the gate, the response signals are received from all the tags that can respond to the transmission of the read signal in each time, pieces of identification information are acquired, a time-series change of intensity of the response signal is obtained in each identical piece of identification information, and the response signal from the tag that correctly passes through the gate is determined based on a waveform of the time-series change. However, in such a method, the process becomes complicated, and a time necessary for the process is lengthened. Therefore the method is not suitable to a use application in which a high-speed process is demanded.

In the disclosure described in Patent Document 3, the mobile tag and the fixed tag respond to the command from the interrogator at different timings, the determination that the mobile object is located on the same passageway as the antenna is made in the case that the communication can be performed with the mobile tag while the communication cannot be performed with the fixed tag, and the determination that the mobile object is located on the passageway different from that of the antenna is made in the case that the communication can be performed with both the mobile tag and the fixed tag. Therefore, the mobile tag on each passageway can accurately be detected.

However, in the disclosure described in Patent Document 3, the time necessary to receive the response from the mobile tag and the time necessary to receive the response from the fixed tag are individually set, and it is necessary to take a time in which a situation of communication with each tag is analyzed. Similarly to Patent Document 2, the process is complicated and time-consuming. Therefore, the disclosure described in Patent Document 3 is not suitable to the use application in which the high-speed process is demanded.

In the disclosure described in Patent Document 3, it is assumed that the mobile object is interposed between the antenna and the fixed tag to interrupt the radio wave. However, an object having a characteristic in which the radio wave is transmitted through the object may become the mobile object. The radio wave from the antenna may be reflected to propagate in an unexpected direction, and therefore the response signal may be sent back from the tag out of the communication range to the antenna that transmitted the command. Patent Document 3 does not describe a measure against such problems.

In view of the foregoing, an object of the present disclosure is to be able to perform communication only with the RFID tag necessary to recognize the mobile object and to shorten the processing time by a simple configuration and an easy process.

SUMMARY OF THE DISCLOSURE

The present disclosure is applied to an RFID system having a communication processing device (communication controller) including an antenna provided in a vicinity of a route through which a mobile object as an object of recognition passes. A mobile RFID tag (hereinafter, referred to as a "mobile tag" in short) having information related to the mobile object written therein and moves with the mobile object. A control device (controller processor) controls the communication processing device, obtains read information obtained by the communication processing device through communication with the mobile tag from the communication processing device, and executes a recognition process for recognizing the mobile object using the read information.

In the above RFID system, for example, the communication processing device is constructed by a reader/writer including an antenna and a communication controller that controls an operation of the antenna. Usually, the reader/writer includes a pair of antennas and the communication controller. In the present disclosure, the communication controller may include a plurality of antennas and a controller that wholly controls the antennas. Alternatively, the communication controller may include a plurality of sets of the antennas and the communication controllers.

The RFID system according to the present disclosure further includes a fixed RFID tag (hereinafter referred to as a "fixed tag" in short) that is arranged fixed on a prescribed location. The fixed tag sends to the antenna a signal whose level is low enough to be buried in a signal received by the antenna from the mobile tag positioned at a location where communication with the antenna is expected and whose level is high enough to bury a signal received by the antenna from the mobile tag positioned at a location where communication with the antenna is not expected.

The mobile tag and the fixed tag of the present disclosure each respond at a prescribed timing to a command from the antenna. The control device causes the communication processing device to repeatedly execute a process of transmitting a read command and receiving a response signal from the RFID tag corresponding to the command, and when read information from the response signal of the mobile tag is obtained from the communication processing device receiving the response signal, executes the recognition process using the read information.

According to the above system, when the read command from the antenna reaches both the mobile tag and the fixed tag, the RFID tags respond at a prescribed timing irrespective of the type of the tag. Therefore, the response signals from the tags substantially simultaneously reach the antenna. However, in the case that the mobile tag is positioned at a location where communication with the antenna is expected, the response signal received from the fixed tag is buried in the response signal received from the mobile tag, and therefore the response signal received from the fixed tag cannot be read while only the information on the response signal received from the mobile tag is read. On the other hand, in the case that the mobile tag is positioned at a location where communication with the antenna is not expected, the response signal received from the mobile tag is buried in the response signal received from the fixed tag and cannot be read, and the information on the response signal received from the fixed tag is read.

Therefore, the information on the mobile tag, which entered the location where communication with the antenna is expected with the movement of the mobile object, can reliably be read. Even if the mobile tag responds to the read command because the read command reaches the mobile tag positioned at a location where communication with the antenna is not expected, the response signal received from the mobile tag is buried in the response signal received from the fixed tag, so that the information on the mobile tag positioned at a location where communication with the antenna is not expected can be prevented from being read.

Even if a plurality of mobile tags respond to the command from the antenna, when only one tag is positioned at a location where communication with the antenna is expected, the information can be read only from the response signal from the tag. Even if the antenna transmitting the read command cannot receive the response signal from the mobile tag, because the antenna can receive the response signal from the fixed tag, there is no risk of a lengthened process caused by waiting for the response signal. Therefore, the processing time can be shortened to easily deal with a site in which a high-speed process is demanded.

In a preferred embodiment of the above system, the antenna and the fixed tag are provided for each of the plurality of routes set for moving the mobile object. The control device causes the antenna of each route to transmit the read command and to receive the response signal, and when information from the response signal of the mobile RFID tag is obtained as the read information, recognizes that the mobile object is positioned in the route corresponding to the antenna that received the response signal including the read information.

According to the above embodiment, in each route, a risk of reading the signal received from the mobile tag on another route is eliminated because of the fixed tag provided on the route, and the information on the mobile tag positioned at a location where communication with the antenna is expected can stably be read in the corresponding route. The information on the mobile tag can reliably be read only by the antenna of the route that the mobile tag enters, which allows the position of the mobile object to be recognized without error.

The control device of the above embodiment further causes the antennas of the routes to sequentially transmit the read command and to sequentially receive the response signal. When the antenna that transmits the read command receives the response signal, the control device causes the next antenna (subsequent antenna) to transmit the read command. According to the present disclosure, because the antenna on the route in which the mobile tag does not exist can also quickly receive the response signal from the corresponding fixed tag after the read command is transmitted, the time required for making a circuit of the receiving processes of the antennas can greatly be shortened.

In another embodiment, the controller further includes a determiner that determines, when the read information of the mobile tag is obtained, whether or not the read information matches the route provided with the antenna that received the response signal including the read information. The controller also includes an outputter that outputs the result of determination by the determiner. According to this embodiment, for example, whether the mobile object correctly moves can be notified by a lamp or a buzzer. In the case that the mobile object enters the route different from the route written in the mobile tag, the mobile object can reliably be detected to issue a warning or close a gate.

In still another embodiment, at least one of the mobile RFID tag and the fixed RFID tag has a function of changing reflection intensity of radio wave for responding to a command from the antenna, in response to a command requesting the change of reflection intensity received from the antenna.

According to this embodiment, the communication process is executed to each mobile tag positioned at a location where communication with the antenna is expected, the mobile tag positioned at a location where communication with the antenna is not expected, and the fixed tag positioned at a prescribed position, a level of the signal received from each tag by the antenna is measured, and the reflection intensity of the radio wave can be adjusted based on the measured values.

Accordingly, when the above process is executed in installing the system, the level of the signal received from the fixed tag by the antenna can be set to the level low enough to be buried in the signal received by the antenna from the mobile tag positioned at the location where communication with the antenna is expected and high enough to bury the signal received by the antenna from the mobile tag positioned at the location where communication with the antenna is not expected. Even if the reception state received from each tag varies after the installation of the system, the relationship between the levels of the signals received from the tags by the antenna can be returned to a favorable state through the above process.

Effects of the Disclosure

According to the present disclosure, a fixed tag is disposed at a location where a command can be received from an antenna, and a relationship between levels of signals received from the fixed tag and the mobile tag by the antenna is adjusted, whereby the information to be read is reliably acquired while the information of the mobile tag positioned at a location where communication with the antenna is not expected is prevented from being read. Therefore, the recognition process can stably be executed. Moreover, the process of receiving the response signal and the process of extracting the read information from the received signal are significantly simplified, so that the processing time can be shortened to easily deal with the use application in which speed enhancement of the process is demanded.

DETAILED DESCRIPTION

Hereinafter, two embodiments with respect to an RFID system to which the present disclosure is applied will be described along with an installation example of the RFID system.

First Embodiment

Figure 1:
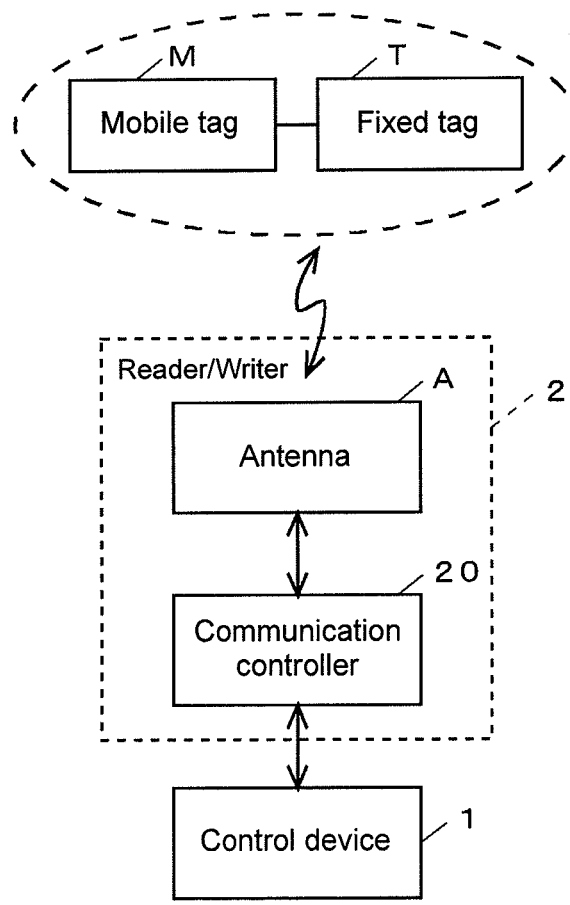
FIG. 1 is a block diagram illustrating a configuration of an RFID system according to a first embodiment.

An RFID system according to a first embodiment is used in order to detect a mobile object that moves in a prescribed direction, and to execute a predetermined recognition process to the mobile object. As illustrated in FIG. 1, a specific system includes two kinds of RFID tags (a mobile tag M and a fixed tag T), a reader/writer 2, and a control device 1.

The reader/writer 2 includes an antenna A and a communication controller 20. In the following installation example, the antenna A and the communication controller 20 are separated from each other. Alternatively, a reader/writer in which the antenna A and the communication controller 20 are integrated may be used.

The RFID tags M and T and the antenna A perform communication with each other by executing a modulation process and a demodulation process using a radio wave having a UHF band (about 860 to about 960 MHz). In the first embodiment, the passive mobile tag M and the passive fixed tag T are used. Alternatively, a semi-passive RFID tag may be used.

The mobile tag M is attached to the mobile object, and moves along with the mobile object. The fixed tag T is arranged fixed on a location where the radio wave having proper intensity is received from the antenna A.

A substance of the control device (controller processor) 1 is a personal computer on which a dedicated program is installed. A microcomputer and a transmitting/receiving circuit are incorporated in the communication controller 20. While repeating a process of transmitting a read command from the antenna A and a process of receiving a response signal from the tags M and T with respect to the read command to decode information included in the response signal in response to an instruction from the control device 1, the communication controller 20 transmits the decoded information as read information to the control device 1. When acquiring the read information from the mobile tag M, the control device 1 executes the recognition process to the mobile object using the read information.

Figure 2:
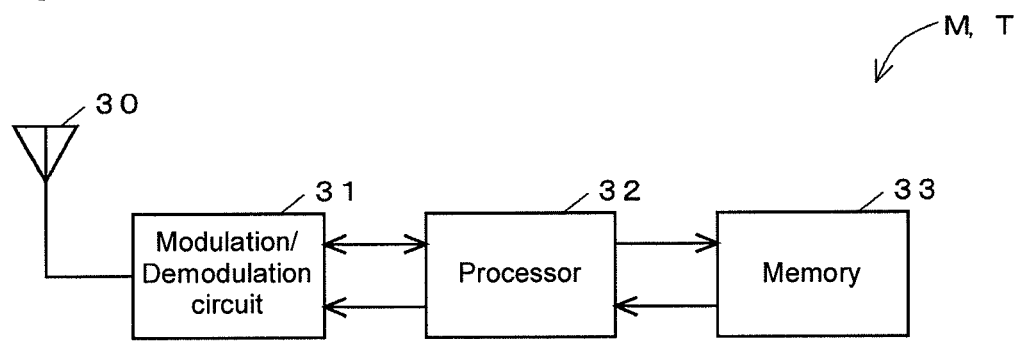
FIG. 2 is a block diagram illustrating a common circuit configuration of a mobile tag and a fixed tag.

FIG. 2 is a block diagram illustrating a common circuit configuration of the mobile tag M and the fixed tag T. As illustrated in FIG. 2, each of the tags M and T includes a communication antenna unit 30, a modulation/demodulation circuit 31, a processor 32 of a microcomputer, and a memory 33.

The antenna unit 30 receives the radio wave including a carrier wave and a command signal from the antenna A on the side of the reader/writer 2. The modulation/demodulation circuit 31 decodes the command signal from the radio wave received by the antenna unit 30 and outputs the decoded command signal to the processor 32, and the modulation/demodulation circuit 31 makes a response by a backscatter method based on the response signal output from the processor 32. The response signal is transmitted to the antenna A through the antenna unit 30.

Type information on the tag (a code indicating the mobile tag or the fixed tag), in which the memory 33 is incorporated, is written in the memory 33, and a setting value (in the example, a setting value of a gain that derives a degree of modulation of the backscatter), which determines reflection intensity when the radio wave from the antenna A is reflected for the purpose of the response to the command, is stored in the memory 33. Additionally, information related to the corresponding mobile object is written in the memory of the mobile object M.

Figure 3:
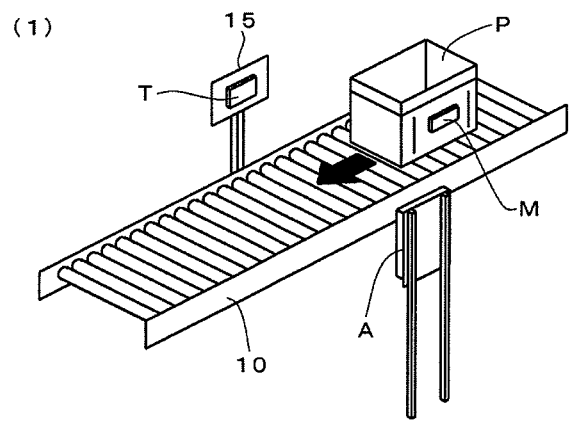
FIG. 3(1) is a view illustrating an installation example of the RFID system of the first embodiment, and FIG. 3(2) is a graph illustrating a characteristic of a signal received from each tag by an antenna.
Figure 3:
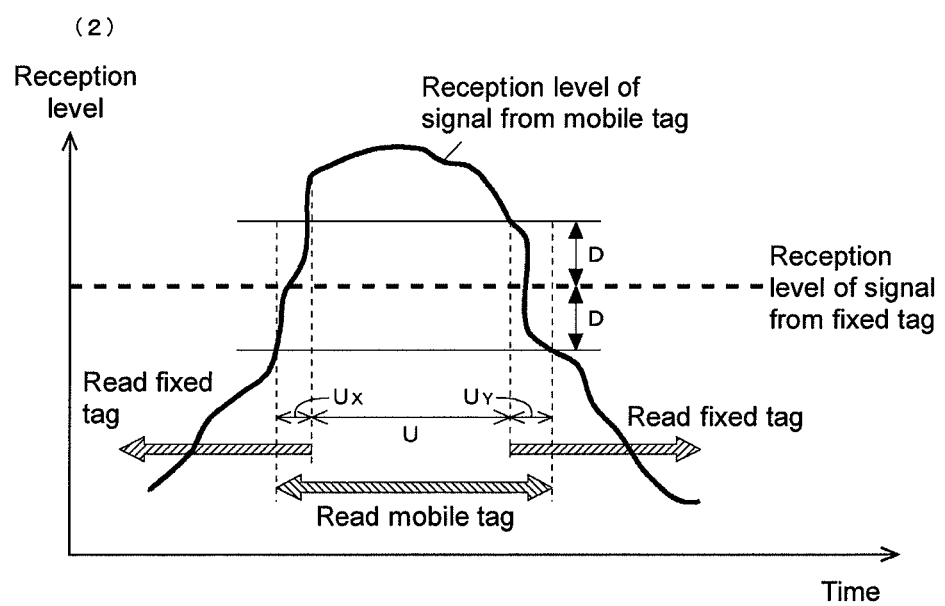

FIG. 3(1) illustrates an example in which the RFID system described above is installed in a production site. In the first embodiment, the mobile object is a pallet P conveyed by a belt conveyer 10, and the mobile tag M is attached to one side surface of the pallet P. The antenna A of the reader/writer 2 is disposed at a location, where the antenna A faces the mobile tag M when the pallet P reaches a predetermined position on the conveyer 10. A stand 15 to which the fixed tag T is attached is disposed at a location across the conveyer 10 from the antenna A.

Although not illustrated in FIG. 3(1), a component is stored in the pallet P. A type code of the component, a component number, a quantity, a model number of an assembled product, identification information on a site to which the component is conveyed, and the like are written in the mobile tag M as the information related to the corresponding mobile object (pallet P).

A command to read the information (hereinafter referred to as a "read command") is repeatedly transmitted from the antenna A based on an instruction from the control device 1. When receiving the read command, each of the fixed tag T and the mobile tag M reads the information stored in the memory 33 thereof, and outputs the response signal including the read information to the antenna A. The communication controller 20 decodes the information included in the response signal received by the antenna A, and transmits the decoded information as read information to the control device 1. Having received the read information, the control device 1 extracts the type code of the tag included in the read information, and analyzes the read information in detail when the type code of the mobile tag M is extracted. Then, for example, the control device 1 determines whether identification information on a conveyance destination of the component is matched with the conveyer 10, and outputs warning information when determined that the identification information is not matched with the conveyer 10. The control device 1 also recognizes the type code of the component and the quantity, and transmits a recognition result to a server that wholly controls a production line.

In the first embodiment, the pallet P is made of a material, such as a synthetic resin and a woody material, through which a radio wave is transmitted. Therefore, even if the pallet P reaches to a front surface of the antenna A to interrupt a space between the antenna A and the fixed tag T, the radio wave from the antenna A transmits through the pallet P to reach the fixed tag T. Similarly, the radio wave reflected from the fixed tag T transmits through the pallet P to reach the fixed tag T. Accordingly, the fixed tag T can always react to the read command from the antenna A to output the response signal irrespective of the location of the mobile tag M. In the first embodiment, in consideration of these points, a relationship illustrated in FIG. 3(2) holds between the signals received from the tags T and M by the antenna A through a setting process described below.

FIG. 3(2) is a graph illustrating changes in levels of the response signals received from the fixed tag T and the mobile tag M by the antenna A with respect to each read command.

As illustrated in the graph of FIG. 3(2), the reception level of the signal from the fixed tag T is substantially kept constant and stable, while a reception level of the signal from the mobile tag M varies into a mound with the movement of the tag M.

Specifically, at first the signal from the mobile tag M is smaller than the signal from the fixed tag T, and a level difference of a prescribed value D or more is generated between the signal from the mobile tag M and the signal from the fixed tag T. The signal received from the mobile tag M is increased as the mobile tag M comes close to the antenna A, and exceeds the signal received from the fixed tag T. Particularly, while the pallet P that is the mobile object passes by the front surface of the antenna A (corresponding to a period U in FIG. 3(2)), the signal received from the mobile tag M is larger than the signal received from the fixed tag T by the level difference D or more. Then, the signal received from the mobile tag M is decreased as the mobile tag M is farther away from the antenna A. The signal received from the fixed tag T becomes stronger again, and the level difference D or more is generated between the signal received from the mobile tag M and the signal received from the fixed tag T.

In the first embodiment, the mobile tag M and the fixed tag T output the response signals in response to the read command from the antenna A at a prescribed timing, namely, immediately after the read command is received, or when a prescribed time elapses since the read command is received. Therefore, in the case that the read command from the antenna A reaches the plurality of tags, possibly the response signals from the tags substantially simultaneously reach the antenna A. However, because the response signals are overlapped in the received signal generated in the antenna A, a waveform of the signal having the stronger reception level becomes dominant. Particularly, when a difference in reception level becomes D or more between a certain response signal and another response signal (hereinafter, D is referred to as a "reference level difference D"), another signal is buried in the signal having the strongest level, and only the signal having the strongest level can be decoded. Therefore, even if the plurality of tags respond to the read command from the antenna A, the signal from one tag can exclusively be read.

In the period U of FIG. 3(2), the mobile tag M is positioned near the front surface of the antenna A. At this point, because the signal from the mobile tag M becomes dominant with the reference level difference D or more with respect to the signal from the fixed tag T, the signal from the fixed tag T is buried in the signal from the mobile tag M, and the signal from the mobile tag M is substantially read. Accordingly, the information on the mobile tag M can reliably be read in the period U.

On the other hand, when the mobile tag M is a prescribed distance or more away from the front surface of the antenna A, because the signal from the fixed tag T becomes dominant with the reference level difference D or more with respect to the signal from the mobile tag M, the signal from the mobile tag M is buried in the signal from the fixed tag T, and the signal from the fixed tag T is substantially read. Accordingly, when the read command reaches the mobile tag M positioned at the location where the communication with the antenna A is not expected, not the information on the mobile tag M but the information on the fixed tag T is read, so that the false read process can be prevented from being executed.

According to the graph of FIG. 3(2), in periods $U_X$ and $U_Y$ before and after the period U, the level difference between the signal from the mobile tag M and the signal from the fixed tag T is smaller than the reference level difference D. Accordingly, in the periods $U_X$ and $U_Y$, it is unclear as to information from which tag is read, and a read error may be generated due to interference of the response signals. However, in a change curve of the signal from the mobile tag M of the first embodiment, a width of a top portion is relatively large, and a steep change is generated in a rising portion and a falling portion. Therefore, the periods $U_X$ and $U_Y$, in which the signal is unstably received, can be shortened. Because a length of the period U is sufficiently ensured, a particular trouble is not generated in reading the information on the mobile tag M.

Figure 4:
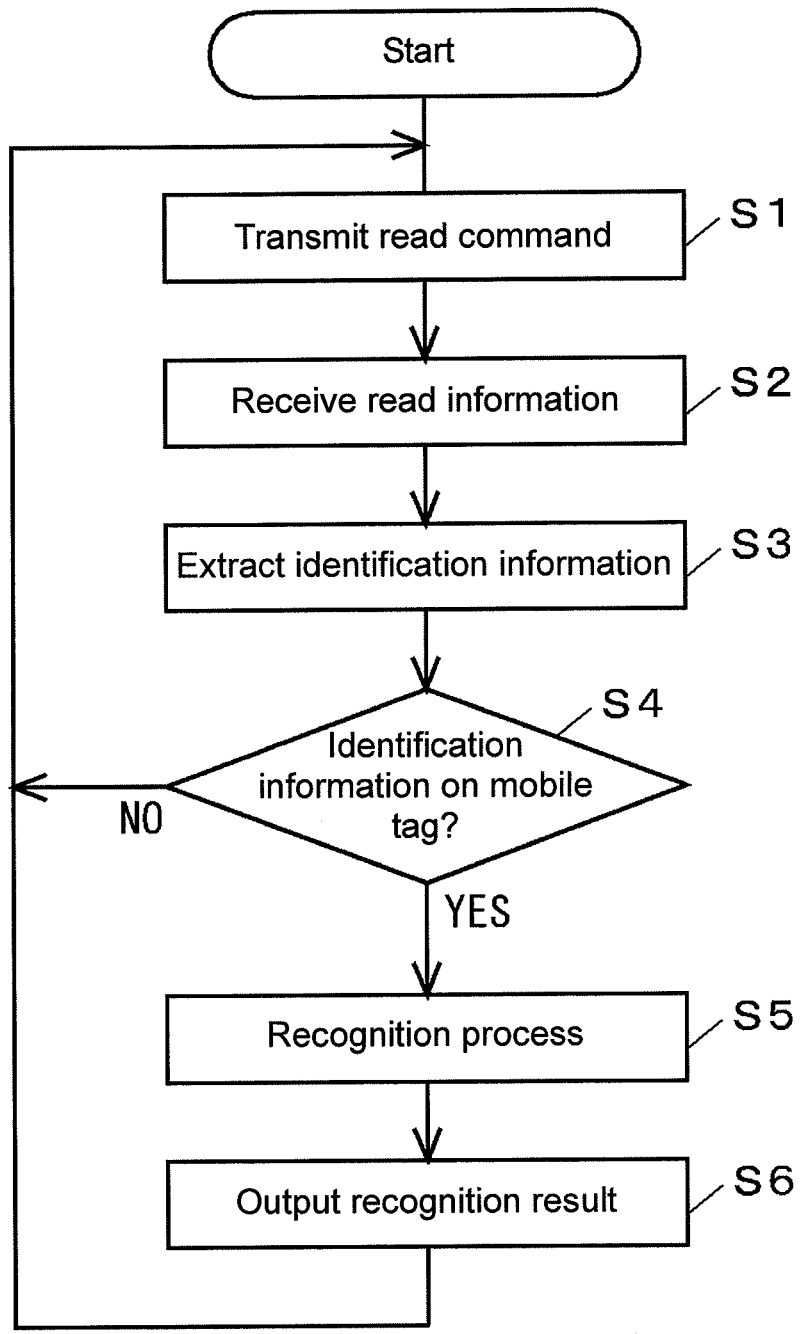
FIG. 4 is a flowchart illustrating a processing procedure in a control device.

FIG. 4 illustrates a procedure of a process executed by the control device 1 of FIG. 1.

As illustrated in the flowchart of FIG. 4, the control device 1 repeatedly performs a loop of steps S1 to S6. In step S1, the control device 1 issues the read command to the reader/writer 2 to perform the transmission. In step S2, the reader/writer 2 receives the response signal corresponding to the read command and decodes the response signal to obtain the read information, and the control device 1 receives the read information. In step S3, the control device 1 extracts the identification information from the read information to identify the type of the corresponding tag.

When the identification information indicates the mobile tag M (YES in step S4), the control device 1 analyzes contents of the recognition process to execute the recognition process described above (step S5), and outputs the result thereof (step S6). When the process of one cycle is ended, the flow returns to step S1 to execute the process of transmitting the next read command.

On the other hand, when the identification information extracted from the read information indicates the fixed tag T (NO in step S4), steps S5 and S6 are skipped and the flow returns to step S1.

According to the process of FIG. 4, the information from the fixed tag T is read to continuously make a determination as "NO" in step S4 when the mobile tag M is a prescribed distance or more away from the front surface of the antenna A. When the mobile tag M reaches the vicinity of the front surface of the antenna A to transmit the response signal having the difference of the reference level difference D or more with respect to the response signal from the fixed tag T, the information on the response signal from the mobile tag M is read to perform steps S5 and S6. In this manner, the information on the mobile tag M is read only in the period in which the mobile tag M exists in the vicinity of the front surface of the antenna A, so that the control device 1 can perform communication stably with each mobile tag M moving on the conveyer 10. Therefore, the recognition process can be executed with high accuracy.

Although not clearly illustrated in FIG. 4, an algorithm related to step S2 is set so as to wait for the reception of the read information until a prescribed waiting time elapses since the transmission of the read command. However, in the first embodiment, because the response signal can be received from the fixed tag T even if the response signal cannot be received from the mobile tag M, step S2 can be ended before time is up. Thus, the processing time of the loop of steps S1 to S4 or the loop of steps S1 to S6 can be shortened, and a time interval at which the read command is transmitted can be shortened. Therefore, the information can be read without trouble when the mobile tag M moves at high speed.

The setting process, which is executed in order that the relationship illustrated in the graph of FIG. 3(2) is established while the antenna A receives the signal from the tag M and T, will be described below.

In the first embodiment, prior to the process of FIG. 4, the level of the signal received from each of the tag M and the tag T by the antenna A is measured by causing the mobile tag M and the fixed tag T to sequentially perform communication with the reader/writer 2. The setting value of the gain stored in the memory 33 of the fixed tag T is rewritten according to the measurement result, whereby reflection intensity of the radio wave is adjusted in the fixed tag T.

Figure 5:
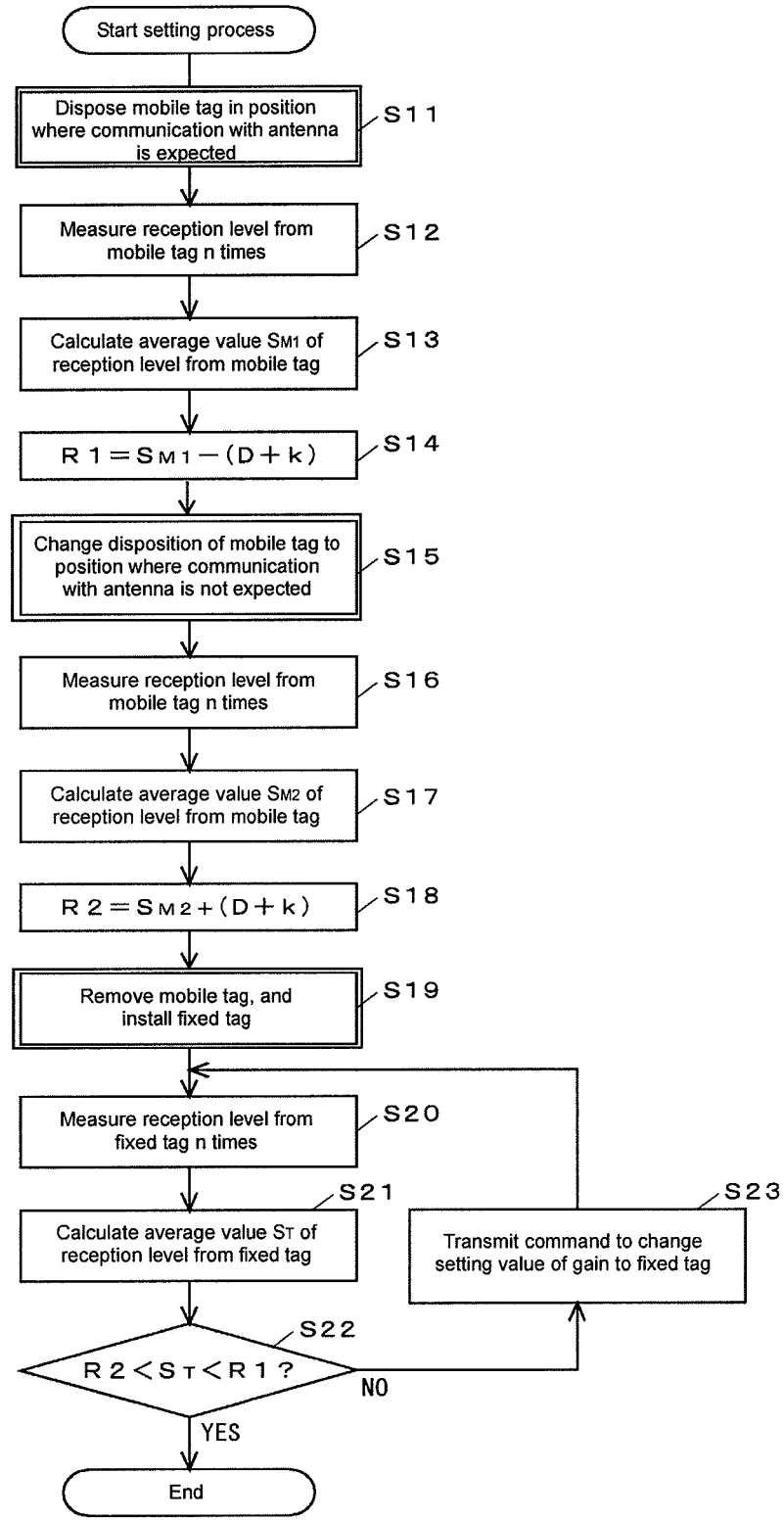
FIG. 5 is a flowchart illustrating a processing procedure of a setting process.

FIG. 5 illustrates a processing procedure of the above setting process. In the procedure, steps S11, S15, and S19 expressed by a double frame are performed by a user in the site, and other steps are performed by the control device 1. However, the communication with the tag is performed through the reader/writer 2.

Contents of the setting process will be described below while the setting process is supplemented by a process that is not illustrated in FIG. 5.

The setting process is started while the fixed tag T is not installed. The user disposes the mobile tag M (correctly, the pallet P to which the mobile tag M is attached, the same holds true in the following description) at the location where the communication with the antenna A is expected (near the front surface of the antenna A) (step S11). The user then inputs a command to start calculation to the control device 1.

Having received the above command, the control device 1 causes the reader/writer 2 to perform communication with the mobile tag M n times (n≥1) to measure the level of the signal received from the mobile tag M in each time of the communication (step S12). Specifically, the control device 1 causes the reader/writer 2 to execute, for n times, a process of transmitting a test command, a process of receiving the response signal with respect to the test command, and a process of measuring the level of received signal, to acquire the measured value in each time.

The control device 1 then calculates an average value $S_{M1}$ of the measured values (step S13), and subtracts the reference level difference D and a predetermined margin value k from the obtained average value $S_{M1}$ (step S14). A value R1 obtained in step S14 is stored as a first reference value in an internal memory of the control device 1.

When the process in step S14 is ended, the control device 1 displays a message that the process in a first stage is ended on a monitor (not illustrated). The user who has checked the message changes the disposition of the mobile tag M to a location where the communication with the antenna A is not expected (step S15). Desirably, a location close to a boundary of the location where the communication with the antenna A may be expected is selected as the changed location.

The user who ends the work to change the disposition of the mobile tag M inputs a command to start the calculation to the control device 1. In response to the input of the command, through the same process as step S12, the control device 1 causes the reader/writer 2 to perform communication with the mobile tag M n times to measure the level of the signal received from the mobile tag M in each time of the communication (step S16). The control device 1 calculates an average value $S_{M2}$ of the n measured values of the reception levels (step S17), and adds the reference level difference D and a predetermined margin value k to the average value $S_{M2}$ (step S18). A value R2 obtained by the calculation in step S18 is stored as a second reference value in the internal memory of the control device 1.

When the process in step S18 is ended, the control device 1 displays on the monitor a message notifying that the process in a second stage is ended. The user who has checked the message moves the mobile tag M to the location where the radio wave from the antenna A does not reach the mobile tag M, and disposes the fixed tag T at a location across the conveyer 10 from the antenna A (step S19). The user then inputs a command to start the setting process performed to the fixed tag T to the control device 1.

Having received the command, similarly to the processes in steps S12 and S16, the control device 1 causes the reader/writer 2 to perform communication with the fixed tag T n times to measure the level of the signal received from the fixed tag T in each time of the communication (step S20). An average value $S_T$ of the measured values is obtained (step S21), and the average value $S_T$ is compared with the reference values R1 and R2.

When the average value $S_T$ is larger than the second reference value R2 while being smaller than the first reference value R1 (YES in step S22), the determination that the reception levels of the signals from the tags M and T satisfy the relationship illustrated in FIG. 3(2) is made to end the process.

On the other hand, when the average value $S_T$ is equal to or smaller than the second reference value R2 or when the average value $S_T$ is not smaller than the first reference value R1 (NO in step S22), the control device 1 transmits the command to change the setting value of the gain to the fixed tag T through the reader/writer 2 (step S23). Specifically, the control device 1 transmits the command to increase the setting value of the gain when the average value $S_T$ is equal to or smaller than R2, and the control device 1 transmits the command to decrease the setting value of the gain when the average value $S_T$ is not smaller than R1.

The fixed tag T that received the command changes the setting value of the gain stored in the memory 33 according to contents of the command, and sends back the response signal indicating that the change is completed. When receiving the response signal through the reader/writer 2, the control device 1 performs steps S20 to S22 again. At this point, in step S20, the signal having the intensity based on the setting value after the change is received from the fixed tag T. Similarly, the loop of steps S20 to S23 is repeated until the average value $S_T$ of the level of the signal received from the fixed tag T falls within a range between the reference values R1 and R2. Then, the process is ended.

According to the setting process of FIG. 5, during the installation of the system, the fixed tag T can be installed so as to be able to receive the signal of which level is low enough to be buried in a signal received by the antenna A from the mobile tag M positioned at a location where communication with the antenna A is expected and high enough to bury a signal received by the antenna A from the mobile tag M positioned at a location where communication with the antenna A is not expected. After the installation of the system, even if the relationship of FIG. 3(2) does not hold between the signals received from the tags T and M due to the variation of the reception state of the radio wave received from the tags T and M, the relationship between the levels of the signals can be returned to the proper state by executing the setting process again.

The setting process is not limited to that illustrated in FIG. 5, and the setting value of the gain of the mobile tag M may be adjusted based on the level of the signal received from the fixed tag T.

In the above example, the degree of modulation is fixed based on the setting value of the gain in the processor 32 of the fixed tag T. Alternatively, the control device 1 may fix an adjustment value of the degree of modulation based on the average value $S_T$, and transmit the command including the adjustment value to the fixed tag T.

In the above example, the reflection intensity of the radio wave is adjusted by changing the degree of modulation of the backscatter. There is no limitation to the adjustment method. For example, a variable attenuator may be provided between the antenna unit 30 and the modulation/demodulation circuit 31 of the fixed tag T to adjust an attenuation amount thereof. A variable capacitor is incorporated in the circuit of the antenna unit 30, and the capacitance of the variable capacitor may be changed according to the change of the setting value of the gain.

Figure 6:
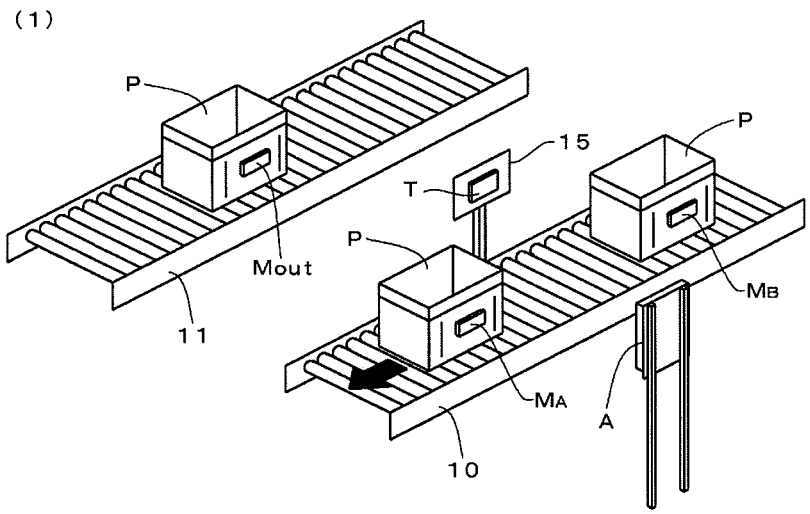
FIG. 6(1) is a view illustrating another installation example of the RFID system of the first embodiment, and FIG. 6(2) is a graph illustrating the characteristic of the signal received from each tag by the antenna.
Figure 6:
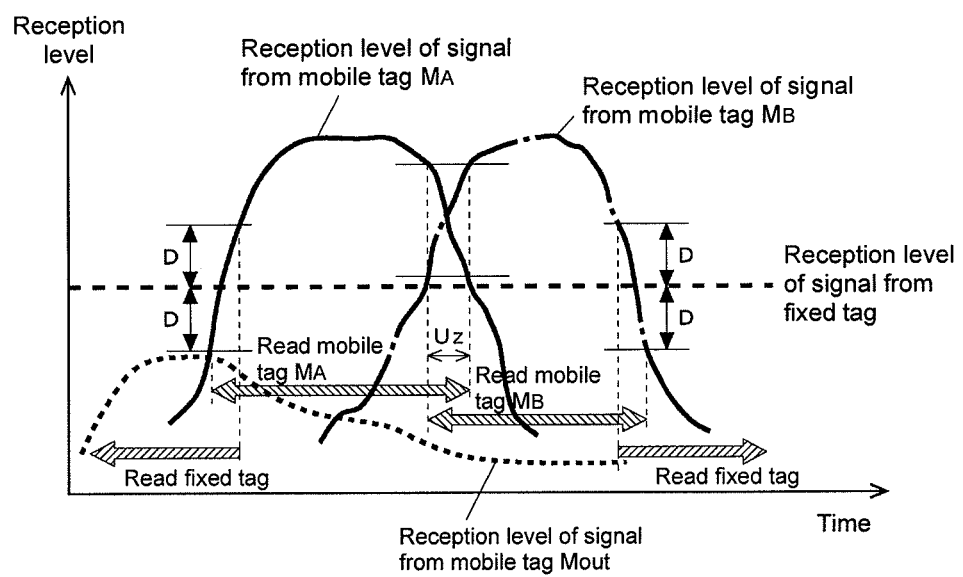

FIG. 6(1) illustrates another installation example of the RFID system of the first embodiment.

In this embodiment as well, the information is read from the mobile tag M that is attached to the pallet P conveyed by the conveyer 10. However, because the distance between the pallets P is narrower than that of the example of FIG. 3(1), a plurality of mobile tags $M_A$ and $M_B$ on the conveyer 10 may respond to the read command from the antenna A. Additionally, because another conveyer 11 is installed adjacent to the conveyer 10, the read command from the antenna A may reach a mobile tag $M_{out}$ positioned on the adjacent conveyer 11, and the response signal is sent back. In this regard, in this embodiment, the reflection intensity of the radio wave in the fixed tag T is adjusted through the same setting process as that of FIG. 5, and the distance between the mobile tag $M_A$ and $M_B$ is also adjusted, whereby a relationship illustrated in FIG. 6(2) holds among the signals received from the tags by the antenna A.

According to FIG. 6(2), the signal received from the fixed tag T is substantially kept constant.

Similarly to the mobile tag M of FIG. 3(1), the signals received from the mobile tags $M_A$ and $M_B$ on the conveyer 10 become levels at which the signal from the fixed tag T is buried when the mobile tags $M_A$ and $M_B$ are positioned near the front surface of the antenna A, and the signals received from the mobile tags $M_A$ and $M_B$ become levels at which the signals are buried in the signal from the fixed tag T when the mobile tags $M_A$ and $M_B$ are a prescribed distance or more away from the front surface of the antenna A. Except the period $U_z$ in the graph, when the signal from one of the mobile tags is dominant compared to the signal from the fixed tag T with the reference level difference D or more, the signal from the other mobile tag becomes lower than the signal from the fixed tag T. Therefore, in both the mobile tags $M_A$ and $M_B$, the period in which the response signal is exclusively read by the antenna A can sufficiently be ensured.

Because the mobile tag $M_{out}$ on the adjacent conveyer 11 is positioned farther away from the antenna than the other tags $M_A$, $M_B$, and T, the signal received from the mobile tag $M_{out}$ is always weaker than the signal received from the fixed tag T, and the level difference between the signals from the mobile tag $M_{out}$ and the fixed tag T becomes the reference level difference D or more. Thus, even if the mobile tag $M_{out}$ on the adjacent conveyer 11 responds to the read command from the antenna A, the response signal of the mobile tag $M_{out}$ cannot be decoded because the response signal is buried in the response signals from the mobile tags $M_A$ and $M_B$ that became dominant compared with the mobile tag $M_{out}$. Therefore, the information on the mobile tag $M_{out}$ can be prevented from being read as the information on the pallet P currently conveyed by the conveyer 10.

Although not illustrated in FIG. 6(1), the antenna and the fixed tag are disposed in the conveyer 11 similarly to the conveyer 10, and possibly the read command from the antenna A of the conveyer 10 reaches the fixed tag of the conveyer 11. However, because the level of the signal received from the fixed tag of the conveyer 11 by the antenna A of the conveyer 10 becomes the low level similarly to the signal from the mobile tag $M_{out}$, the information on the fixed tag of the conveyer 11 is not recognized as the information on the fixed tag T of the conveyer 10.

Figure 7:
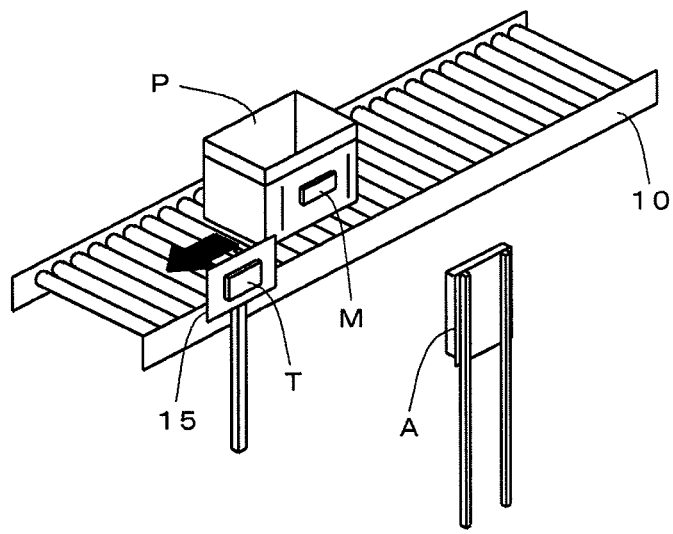
FIG. 7 is a view illustrating another example of a disposition of the fixed tag.

In the examples of FIGS. 3(1) and 3(2) and FIGS. 6(1) and 6(2), the fixed tag T is positioned at the location across the conveyer 10 from the antenna A. However, it is not necessary to restrict the installation location of the fixed tag T as long as the same relationship illustrated in each of the graphs of FIGS. 3(2) and 6(2) holds with respect to the signal from the mobile tag M. For example, as illustrated in FIG. 7, the stand 15 to which the fixed tag T is attached may be disposed between the antenna A and the conveyer 10. The fixed tag T may integrally be provided in the antenna A or communication controller 20 of the reader/writer 2.

When there is no possibility that the signal having the decodable level reaches the antenna A from the tag in the space out of the conveyer 10, the fixed tag T is not disposed, but only the transmission level of the mobile tag M or the distance between the mobile tags M may be adjusted. For example, as in the example of in FIGS. 6(1) and 6(2), when the period in which the response signal with respect to the read command from the mobile tag is exclusively read by the antenna A can sufficiently be ensured for each of the mobile tags moving on the conveyer 10, the read process can stably be executed to each mobile tag without providing the fixed tag T.

Second Embodiment

Figure 8:
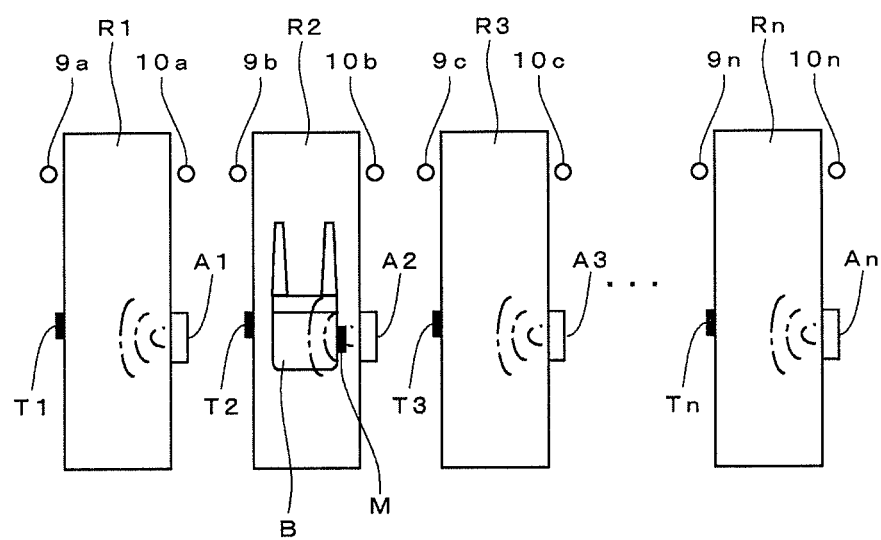
FIG. 8 is a view illustrating an installation example of an RFID system according to a second embodiment.

A system according to a second embodiment is aimed at management of entrance and exit. FIG. 8 illustrates an installation example of the system.

The second embodiment is aimed to prevent false shipping of goods when the goods are loaded up in a cargo container by the forklift B. In the site, conveyance routes R1, R2, R3, ... Rn corresponding to a plurality of cargo containers (not illustrated) having different shipping addresses are provided in parallel and close to each other.

Antennas A1 to An of the reader/writer are laterally disposed in the routes R1 to Rn, and fixed tags T1 to Tn are disposed at locations across the routes R1 to Rn from the antennas A1 to An, respectively.

Pairs of indicating lamps 9a to 9n and 10a to 10n are disposed on both sides of the routes A1 to An at tailing end locations (in front of gates) of the routes A1 to An, respectively. The indicating lamps 9a, 9b, 9c, ..., 9n disposed on the left with respect to the movement direction of the forklift B emit blue light indicating permission for passage, and the indicating lamps 10a, 10b, 10c, ..., 10n disposed on the right emit red light indicating refusal of passage.

The mobile tag M is attached to the forklift B at a point that has a relationship facing the antennas A1 to An when the forklift B enters the routes R1 to Rn. The tags M and T1 to Tn and the antennas A1 to An perform communication with each other using the radio wave having the UHF band by executing the modulation process and the demodulation process, respectively. In the second embodiment, the passive RFID tag is used as the tags M and T1 to Tn. Alternatively, a semi-passive RFID tag may be used.

In addition to the type code indicating the mobile tag, pieces of other necessary information such as an identification number of the route through which the forklift B is expected to pass, a product number of shipping goods, a customer code, and a production plant code of a customer are previously written in the mobile tag M as the information related to the corresponding mobile object. The type code indicating the fixed tag and the code of the corresponding route are written in the fixed tags T1 to Tn.

Figure 9:
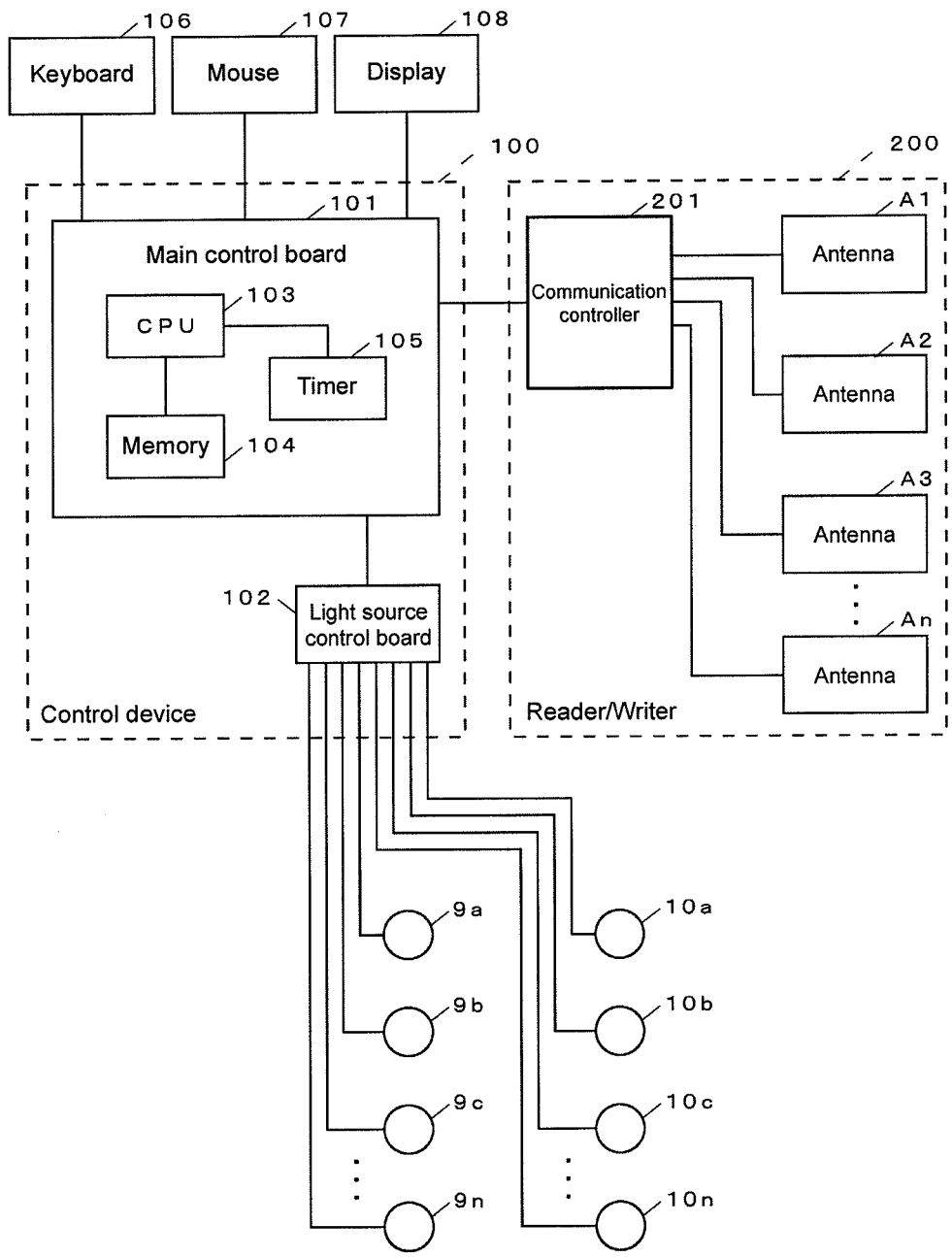
FIG. 9 is a block diagram illustrating a configuration of the RFID system of the second embodiment.

FIG. 9 is a block diagram illustrating a system configuration (however, the tags T1 to Tn and M are not illustrated) in the second embodiment.

A reader/writer 200 used in the RFID system of the second embodiment includes the antennas A1 to An of the routes R1 to Rn and a communication controller 201 common to the antennas A1 to An. A main control board 101 and a light source control board 102 are incorporated in the control device 100. The main control board 101 includes a CPU 103, a memory 104, and a later-described timer 105 for a timing process.

The communication controller 201 of the reader/writer 200 is connected to the main control board 101 through an interface such as RS232C. Additionally, peripheral devices such as a keyboard 106, a mouse 107, and a display 108, and the light source control board 102 are connected to the main control board 101. The indicating lamps 9a to 9n and 10a to 10n are connected to the light source control board 102.

The memory 104 of the main control board 101 is provided with a storage area in which a program used for the calculation is stored and pieces of read information decoded from the response signals received by the antennas A1 to An are temporarily stored, a register area constituting a software timer, a database in which the information read from mobile tag is stored, and a storage area in which history data (log data) of the process is stored. Further, in the memory 104, the pieces of information such as the product number of the shipping goods in which the passage is permitted and the customer code and production plant code of the corresponding container are registered for each of the route R1 to Rn.

In the above configuration, the CPU 103 of the main control board 101 causes the communication controller 201 of the reader/writer 200 to sequentially actuate the antennas A1 to An to transmit the read command and to receive the response signal, and the CPU 103 acquires read information that is decoded from the response signal by the communication controller 201. The CPU 103 determines the type of the acquired read information. When determined as the read information of the mobile tag M, the CPU 103 determines whether the read information is proper by checking the read information against the registration information corresponding to the antenna that received the read information.

In the installation example of FIG. 8, the read command output from each of the antennas A1 to An of the routes R1 to Rn not only reaches the fixed tags T1 to Tn and mobile tag M of the corresponding route but may also reach the fixed tags and mobile tags of other routes. Therefore, in the second embodiment, based on the same principle as the system of the first embodiment, the reflection intensity of the radio wave of each tag is set, such that the signals from the tags positioned outside the fixed tag Ti and the route Ri (i=1 to n) cannot be decoded because the signals are buried in the signal transmitted from the mobile tag M to an antenna Ai when the mobile tag M is positioned near the front surface of the antenna Ai of the route Ri, and when the mobile tag M is not included in the route Ri, such that the signal transmitted from the fixed tag Ti to the antenna Ai has the highest level, and such that the signals from the tags other than the fixed tag Ti cannot be decoded because the signals are buried in the signal from the fixed tag Ti. According to the setting, the antennas A1 to An reliably receive the response signals from the mobile tags M positioned at the locations where the communication with the antennas A1 to An is expected, respectively, and the response signal from the tag, such as the mobile tag M positioned on another route, which is positioned at the location where the communication with the antenna is not expected can be prevented from being read.

Figure 10:
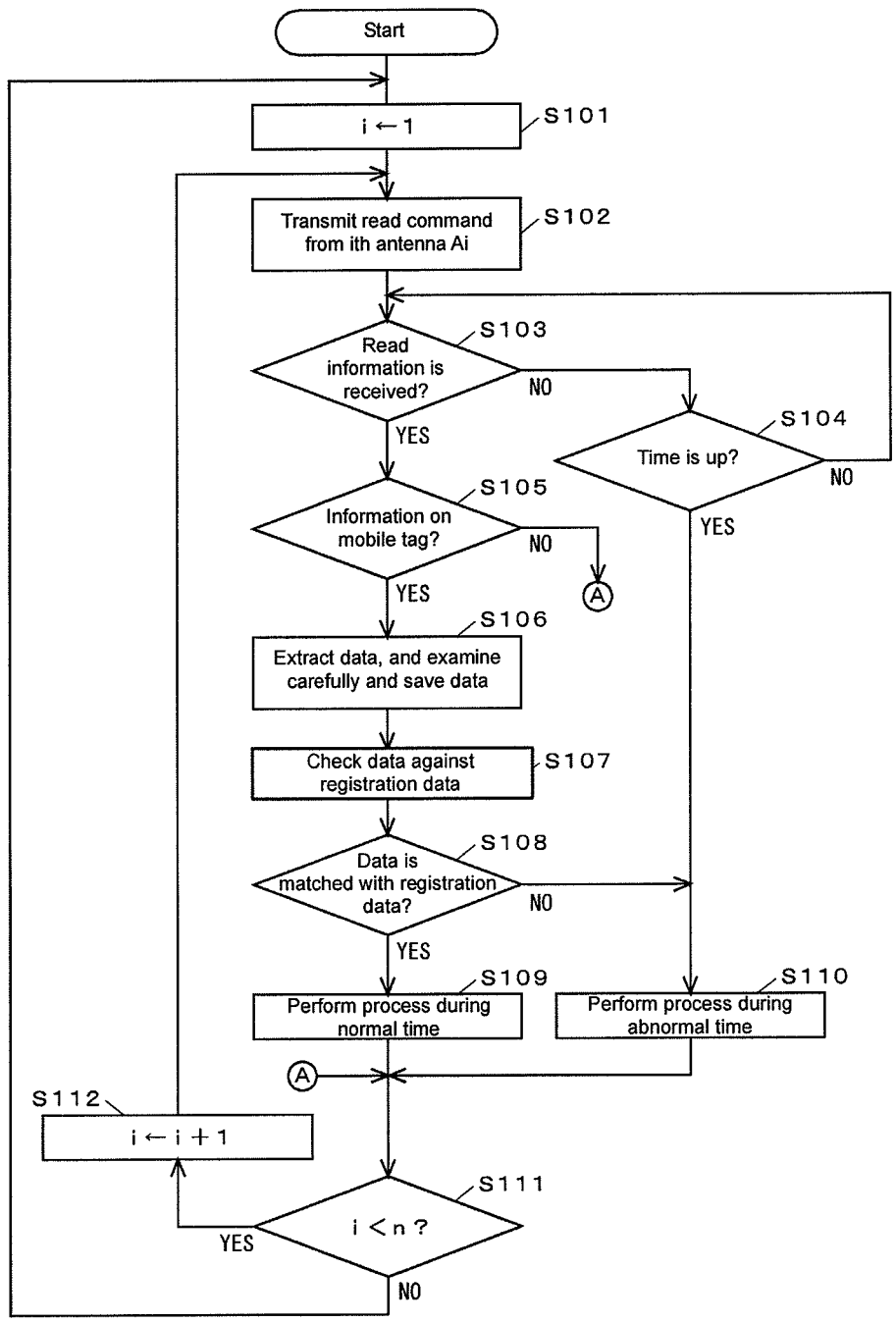
FIG. 10 is a flowchart illustrating a processing procedure in a control device.

A process executed by the control device 100 of the RFID system of the second embodiment will be described below with reference to a flowchart of FIG. 10.

In first step S101, a counter i that specifies the route of the processing target is set to an initial value of "1". In next step S102, the control device 100 causes the antenna Ai (in the initial state, antenna A1) to transmit the read command.

Having received the read command, the fixed tags T1 to Tn and the mobile tag M of the second embodiment send back the response signals at a prescribed timing. The CPU 103 of the control device 100 causes the timer 105 to start timing in response to the transmission of the read command, and the CPU 103 waits for the transmission of the read information until the time of the timer 105 reaches a predetermined upper limit (that is set so as to be longer by a prescribed time than a time necessary to send back the response signal) (steps S103 and S104).

During the waiting time, the antenna Ai receives the response signal with respect to the read command, and the communication controller 201 decodes the read information and transmits the decoded read information to the control device 100, whereby the determination is made as "YES" in step S103. Having received this, the CPU 103 determines the type of the tag corresponding to the read information based on the data configuration of the received read information (step S105).

When the read information includes the type code and the code of the route Ri of the fixed tag, the CPU 103 determines that the read information is the information on the fixed tag Ti. In this case, because the determination is made as "NO" in step S105, the counter i is updated (steps S111 and S112), and the flow returns to step S102. In the case that the counter i reaches n, the flow returns from step S111 to step S101 to reset the counter i to the initial value of "1". Then, the flow goes to step S102.

When the read information includes the type code of the mobile tag, the determination is made as "YES" in step S105, and the flow goes to step S106. In step S106, various pieces of data are classified and extracted from the read information, and whether the data is corrupted is accurately checked. Then, the pieces of data are stored as temporary data in the memory 104. In next step S107, the temporarily-stored data is checked against the registration data related to the route Ri.

When the temporarily-stored data is matched with the registration data by the checking process (YES in step S108), the flow goes to a process during a normal time in step S109. For example, the process during the normal time includes a process of transmitting a control command signal to the light source control board 102 in order to actuate the blue indicating lamp of the route Ri, a process of storing various pieces of data extracted from the read information in the database, and a process of writing the executions of the processes in log data.

On the other hand, when it is recognized that the temporarily-stored data is not matched with the registration data by the checking process, the determination is made as "NO" in step S108, and the flow goes to a process during an abnormal time in step S110. For example, the process during the abnormal time includes a process of transmitting the control command signal to the light source control board 102 in order to actuate the red indicating lamp of the route Ri, a process of displaying the generation of the abnormality on the display 108, the process of storing various pieces of data extracted from the read information in the database, and the process of writing the executions of the processes in the log data.

In the case that the propagation of the radio wave is interrupted between the antenna Ai and the fixed tag Ti from any cause, the read information cannot be acquired even if the waiting time since the transmission of the read command (step S102) reaches the upper limit. In this case, the determination is made as "YES" in step S104, the flow goes to step S110 to execute the process during the abnormal time. Although not illustrated in FIG. 10, when the information on another fixed tag is read due to a breakdown of the fixed tag Ti of the route Ri, the identification information on the route included in the read information is not matched with the counter i. When such a mismatch is generated, an abnormal process different from that of step S110 is executed.

As described above, in the second embodiment, the antennas A1 to An of the routes R1 to Rn sequentially transmit the read commands, and the read information decoded from the response signal received by each of the antennas A1 to An is acquired, and whether the read information is the information suitable to the route corresponding to the antenna from which the read information is acquired is recognized when the read information is the information on the mobile tag, and the user is informed of the recognition result using the indicating lamps 9a to 9n and 10a to 10n. As described above, in each antenna Ai, when the mobile tag M that is attached to the forklift B entering the corresponding route Ri is positioned near the front surface of the antenna Ai, the response signal from the mobile tag M is exclusively read. On the other hand, the response signal from the mobile tag M that is a prescribed distance or more away from the front surface of the antenna Ai is not read, so that the control device 100 can correctly recognize the route in which the forklift B proceeds and correctly determine whether the proceeding location is proper.

In the second embodiment, the process is executed to the routes R1 to Rn one by one. The fixed tag Ti can react to the read command as long as the radio wave is not interrupted between the currently-activated antenna Ai and the fixed tag Ti facing the antenna Ai. Accordingly, even if the mobile tag M is not included in the route Ri corresponding to the antenna Ai, the response signal can be quickly be acquired from the fixed tag Ti in response to the transmission of the read command, and the time necessary to make a circuit of the processes executed to the routes R1 to Rn can be shortened. Moreover, cost can be reduced compared with the case that the reader/writer is provided in each of the routes R1 to Rn.

Instead of the above configuration, the process may concurrently be executed to the routes R1 to Rn by combining the communication controller in each of the antennas A1 to An of the routes R1 to Rn.

Figure 11:
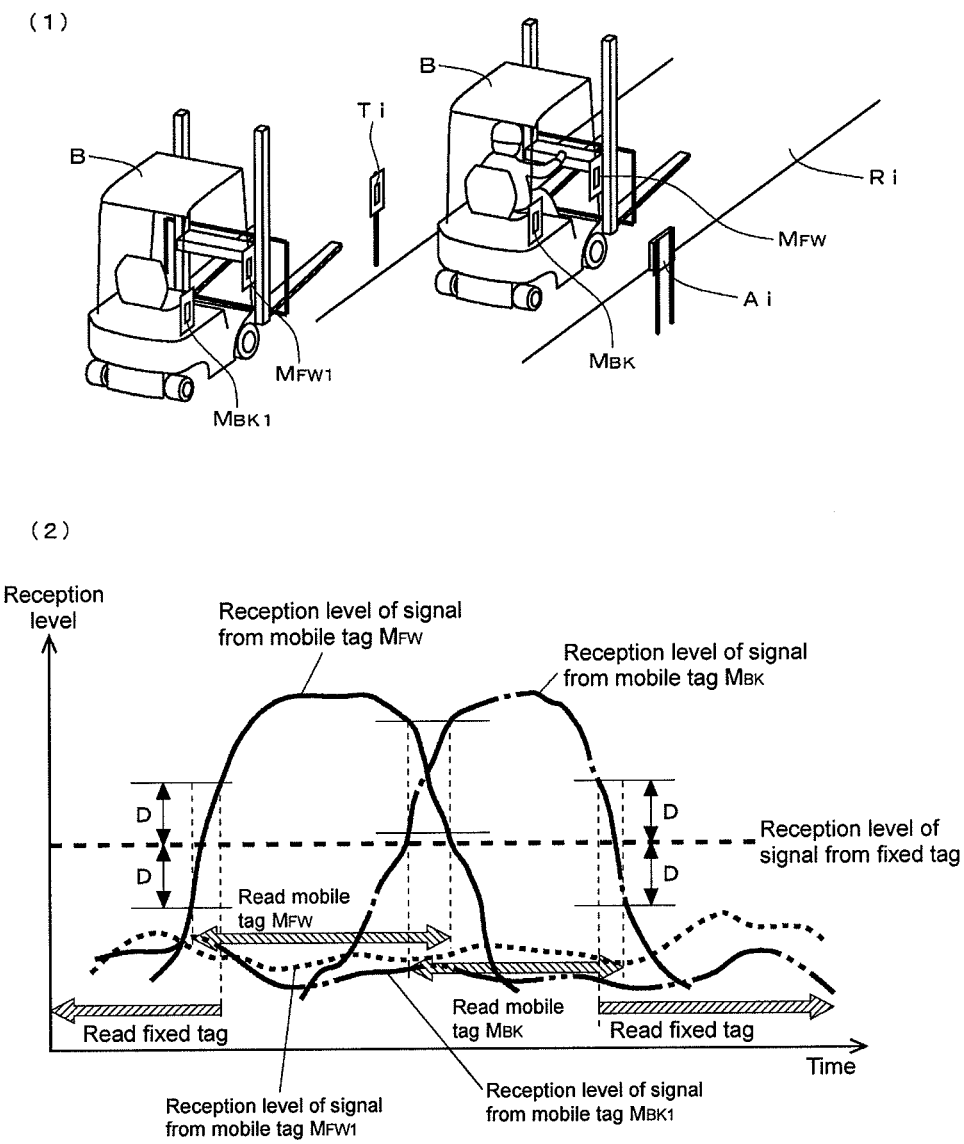
FIG. 11(1) is a view illustrating a method for recognizing forward and backward movements of a forklift using a pair of mobile tags, and FIG. 11(2) is a graph illustrating the characteristic of the signal received from each tag by the antenna when the method is applied.

In the RFID system of the second embodiment, similarly to the example of FIGS. 6(1) and 6(2), the read process can be executed to the plurality of mobile tags positioned on the same route according to the order of the movement of each mobile tag. FIG. 11(1) illustrates an example in which the principle is applied, and the a pair of mobile tags $M_{FW}$ and $M_{BK}$ is laterally arranged in the forklift B with a prescribed distance. The control device 100 recognizes whether the forklift B moves forward or backward based on the order in which the pieces of information are read from the mobile tags $M_{FW}$ and $M_{BK}$. In order to obtain the accuracy of the recognition, in this embodiment, a relationship illustrated in FIG. 11(2) holds between the signals received from the tags by the antenna Ai.

FIG. 11(2) is a graph illustrating the change of the level of signal received from each tag by the antenna Ai when the forklift B moves forward on the route Ri. In this example as well, the signal received from the fixed tag Ti is substantially kept constant. In the mobile tags $M_{FW}$ and $M_{BK}$, the signal from the mobile tag $M_{FW}$ that reaches the front surface of the antenna Ai is initially received, and then the signal from the mobile tag $M_{BK}$ is received. In both the mobile tags $M_{FW}$ and $M_{BK}$, the period in which the signal from one of the mobile tags $M_{FW}$ and $M_{BK}$ becomes dominant with the reference level difference D or more with respect to the fixed tag and the other mobile tag is significantly ensured.

FIG. 11(1) illustrates the forklift B stopping on the side of the route Ri, and FIG. 11(2) illustrates the changes of the levels of signals received from the mobile tags $M_{FW1}$ and $M_{BK1}$ attached to the forklift B by the antenna Ai. These signals are always weaker than the signal from the fixed tag Ti, and the signals have the difference of the reference level difference D or more with respect to the signal from the fixed tag Ti. Accordingly, the signals from the mobile tags $M_{FW1}$ and $M_{BK1}$ cannot be decoded because the signals are buried in the signal from the fixed tag Ti irrespective of the presence or absence of the mobile tag on the route Ri. Therefore, the pieces of information on the mobile tags $M_{FW1}$ and $M_{BK1}$ are not read from the signal received by the antenna Ai.

The relationship among the signals is implemented by adjusting the setting process pursuant to FIG. 5 and the distance between the mobile tags $M_{FW}$ and $M_{BK}$. With this adjustment, the pieces of information on the mobile tags $M_{FW}$ and $M_{BK}$ that enter the route Ri is read when the mobile tags $M_{FW}$ and $M_{BK}$ comes to the location (the front surface of the antenna) where the communication with the antenna Ai is expected, so that the read process can be executed to the mobile tags $M_{FW}$ and $M_{BK}$ in the correct order to exactly recognize the movement direction of the forklift B.

In the installation examples related to the system of the first and second embodiments, only the read process is executed to the mobile tag. The present disclosure is not limited thereto, and after the mobile tag is specified by the read command, a write command in which the mobile tag is assigned as the communication target may be transmitted to write new information in the mobile tag.

Figure 12:
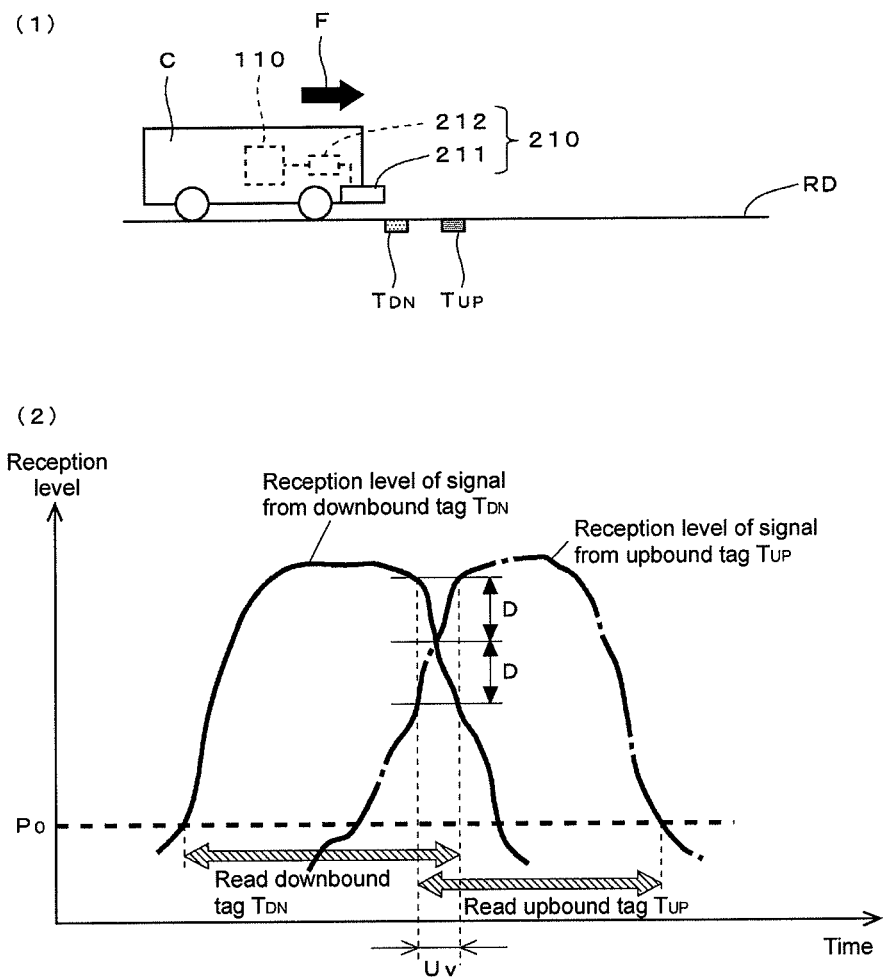
FIG. 12(1) is a view illustrating an configuration and an installation example of an RFID system aimed at recognition of a running direction of a vehicle, and FIG. 12(2) is a graph illustrating the characteristic of the signal received from each tag by the antenna.
Figure 13:
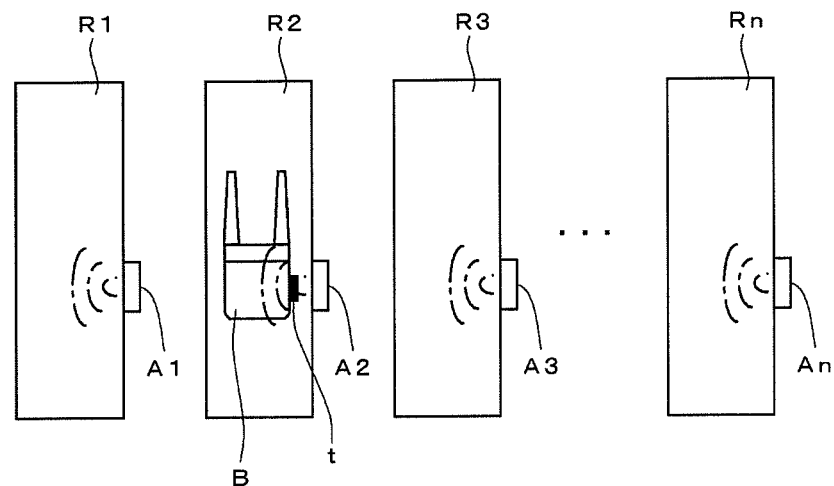
FIG. 13 is a view illustrating an installation example of a conventional RFID system aimed at management of entrance and exit.
Figure 14:
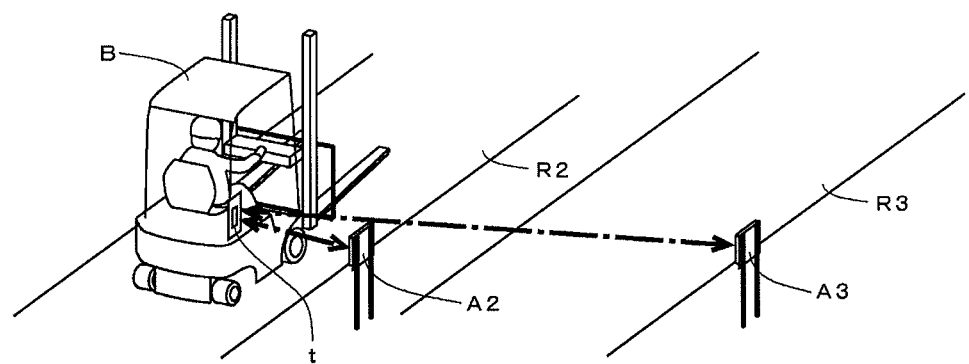
FIG. 14 is a view illustrating a problematic point of the system in FIG. 13.

In the example of FIGS. 11(1) and 11(2), the forward and backward movements of the mobile object are recognized through the read process executed to the pair of mobile tags $M_{FW}$ and $M_{BK}$ attached to the mobile object (forklift B). Alternatively, a system that recognizes the movement direction of the progressive vehicle can also be constructed. FIGS. 12(1) and 12(2) illustrate an example thereof.

In the embodiment of FIGS. 12(1) and 12(2), an antenna 211 of a reader/writer 210 is attached to a vehicle body of a vehicle C, and a pair of fixed tags $T_{DN}$ and $T_{UP}$ is disposed along a length direction of a running road RD of the vehicle C (for example, the tags $T_{DN}$ and $T_{UP}$ are buried under a road surface of the running road RD). A communication controller 212 of the reader/writer 210 and the control device 100 are provided in the vehicle C.

In FIG. 12(1), an arrow F indicates an upbound direction of the vehicle C. Hereinafter, in the pair of fixed tags $T_{UP}$ and $T_{DN}$, the tag $T_{UP}$ positioned on the upbound side is referred to as an "upbound tag $T_{UP}$", and the tag $T_{DN}$ positioned on the downbound side is referred to as a "downbound tag $T_{UP}$". The type information indicating the type of the tag and the like are stored in the memory of each of the tags $T_{UP}$ and $T_{DN}$.

With the running of the vehicle C, the control device 110 repeatedly causes the reader/writer 210 to transmit the read command and to receive the response signal, and the control device 110 inputs the read information decoded by the response signal, and determines the information on the tag based on the type information. When the information on the downbound tag $T_{DN}$ is acquired after the information on the upbound tag $T_{UP}$ is acquired, the control device 110 recognizes that the vehicle C is moving along the downbound direction. When the information on the upbound tag $T_{UP}$ is acquired after the information on the downbound tag $T_{DN}$ is acquired, the control device 110 recognizes that the vehicle C is moving along the upbound direction.

In order to secure the accuracy of the recognition, in the second embodiment, the reflection intensity of the radio wave in each of the tags $T_{UP}$ and $T_{DN}$ and the distance between the tags are adjusted such that a relationship illustrated in FIG. 12(2) holds between the signals received from the tags $T_{UP}$ and $T_{DN}$ by the antenna 211. For example, the locations of the tags $T_{UP}$ and $T_{DN}$ are fixed, the tags $T_{UP}$ and $T_{DN}$ are temporarily disposed at the fixed locations in order, the reception level is measured when the antenna 210 is positioned at the location where the communication with the tentatively-disposed tag is expected, and the reception level is measured when the antenna 210 is positioned at the location where the communication with the other tag is expected. The reflection intensity of the radio wave in each of the tags $T_{UP}$ and $T_{DN}$ is adjusted based on the measured values.

In the graph of FIG. 12(2), P0 corresponds to the minimum reception level necessary to decode the information from the response signal.

In the example of FIG. 12(2), first, the state in which the response signal is received from the downbound tag $T_{DN}$ is established with respect to the read command from the antenna 211, and then the state in which the response signal is received from the upbound tag $T_{UP}$ is established. Each of the reception levels of the signals from the tags $T_{DN}$ and $T_{UP}$ is changed into a mound, and one of the signals becomes dominant with the reference level difference D or more with respect to the other signal except the period $U_v$ of FIG. 12(2).

According to the relationship of the signal change, in both the tags $T_{UP}$ and $T_{DN}$, the period, in which the signal having the level at which the signal from the other tag is buried can be transmitted to the antenna 211, is sufficiently ensured, so that the read process can be executed to the tags $T_{UP}$ and $T_{DN}$ in the correct order. Therefore, the running direction of the vehicle C can correctly be recognized.

At least three fixed tags may be disposed in the running road RD. In the case that the number of fixed tags is increased, similarly to the example of FIGS. 12(1) and 12(2), the reflection intensity of the radio wave in each tag and the distance between the tags are set such that the period, in which the signal having the level at which the signal from the other tag is buried can be transmitted to the antenna 211, is sufficiently ensured.

DESCRIPTION OF SYMBOLS $M, M_A, M_B, M_{FW}, M_{DN}$, M1 to Mn mobile tag
T, T1 to Tn fixed tag
A, A1 to An antenna
P, B, C mobile object
1, 100 control device
2, 200 reader/writer

What is claimed is:

1. An RFID system, comprising:
a communication controller including a plurality of antennas provided in vicinities of each of a plurality of routes through which a mobile object, as an object of recognition, passes;
a plurality of fixed RFID tags arranged fixedly in vicinities each of the plurality of routes;
a mobile RFID tag having information related to the mobile object written therein and configured to move with the mobile object; and
a controller processor configured to control the communication controller, configured to obtain read information obtained by the communication controller through communication with the mobile RFID tag from the communication controller, and configured to recognize that the mobile object is positioned in a route of the plurality of routes corresponding to an antenna of the plurality of antennas that received a response signal of the mobile RFID tag including the read information when information from the response signal of the mobile RFID tag is obtained as read information;
wherein the mobile RFID tag and the plurality of fixed RFID tags respond at a prescribed timing to a received read command so that all of the mobile RFID tag and the plurality of fixed RFID tags which received the read command from one of the plurality of antennas respond in exact timing with each other;
wherein the plurality of fixed RFID tags respond to the read command received from one antenna of the plurality of antennas that is located in corresponding route with a signal having a level low enough to be buried in the response signal transmitted from the mobile RFID tag and the signal being unable to be decoded when the mobile RFID tag is located at location where communication with the one antenna is expected and a level high enough to bury a response signal transmitted from other of the mobile RFID tag and the plurality of fixed RFID tags which received the read command from the antenna and only a signal of the fixed RFID tag is decoded when the mobile RFID tag is not located at a location where communication with the antenna is expected;
wherein the mobile RFID tag responds to the read command received from the antenna located at the route through which the mobile RFID tag passes when the mobile RFID tag passes a location where communication with the antenna is expected with a signal having a level high enough to bury the response signal to the read command, the response signal transmitted from the fixed RFID tag located at the route, and only a signal of the mobile RFID tag is decoded; and
wherein the controller processor further includes an antenna controller that repeatedly executes a process while changing a control object to a subsequent antenna of the plurality of antennas depending on obtaining the read information of the response signal from the antenna transmitting the read command, the process including causing the antenna of each of the plurality of routes to transmit the read command in order, and receive the response signal to the read command from the mobile RFID tag and the fixed RFID tag;
a determiner that determines, when the read information of the response signal of the mobile RFID tag is obtained from the antenna of the predetermined route, whether or not the read information matches the route provided with the antenna that received the response signal including the read information; and
an outputter that outputs the result of the determination by the determiner.

2. The RFID system according to claim 1, wherein
at least one of the mobile RFID tag and the plurality of fixed RFID tags are configured to change a reflection intensity of a radio wave for responding to a command from one of the plurality of antennas, in response to a command requesting the change of reflection intensity received from the one of the plurality of antennas.

3. The RFID system according to claim 1, wherein
the mobile RFID tag responds to the read command received from the antenna located at the route through which the mobile RFID tag passes when the mobile RFID tag passes the location where communication with the antenna is expected with a signal having a level high enough to disable decoding a response signal transmitted from other mobile RFID tags positioned at out of the location where communication with the antenna is expected by burying the signal.

* * * * *